US009835510B2

United States Patent
Tham

(10) Patent No.: US 9,835,510 B2
(45) Date of Patent: Dec. 5, 2017

(54) CERAMIC PRESSURE SENSOR AND METHOD FOR ITS PRODUCTION

(71) Applicant: Endress + Hauser GmbH + Co. KG, Maulburg (DE)

(72) Inventor: Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 82 days.

(21) Appl. No.: 14/876,221

(22) Filed: Oct. 6, 2015

(65) Prior Publication Data
US 2016/0103031 A1    Apr. 14, 2016

(30) Foreign Application Priority Data
Oct. 13, 2014    (DE) .................. 10 2014 114 764

(51) Int. Cl.
*G01L 9/04* (2006.01)
*G01L 9/00* (2006.01)
(Continued)

(52) U.S. Cl.
CPC .......... *G01L 9/0075* (2013.01); *B22F 3/1055* (2013.01); *B22F 7/06* (2013.01); *B28B 1/001* (2013.01); *B28B 1/008* (2013.01); *B33Y 10/00* (2014.12); *B33Y 70/00* (2014.12); *B33Y 80/00* (2014.12); *C04B 35/111* (2013.01); *C04B 35/486* (2013.01); *C04B 35/653* (2013.01); *C04B 37/006* (2013.01); *B22F 2999/00* (2013.01); *C04B 2235/6026* (2013.01); *C04B 2235/665* (2013.01); *C04B 2235/72* (2013.01); *C04B 2237/122* (2013.01);
(Continued)

(58) Field of Classification Search
None
See application file for complete search history.

(56) References Cited

U.S. PATENT DOCUMENTS 8,915,142 B2    12/2014 Drewes
2002/0175076 A1    11/2002 Gora
(Continued)

FOREIGN PATENT DOCUMENTS

DE        10041554 A1    3/2002
DE    102009003178 A1    11/2010

OTHER PUBLICATIONS

Dr. Alexander Kaya, "Nanos3DSense Sensorik-Plattform" NanoScale Systems, Nanoss GmbH 2014.
German Search Report, German PTO, Munich, DE, Nov. 3, 2014.

*Primary Examiner* — Andre Allen
(74) *Attorney, Agent, or Firm* — Bacon & Thomas, PLLC

(57) ABSTRACT

A ceramic pressure sensor is described which is produced using an alternative production method and has a ceramic base body, a ceramic measuring membrane which is disposed on the base body and is to be charged with a pressure to be measured, and a pressure measuring chamber enclosed in the base body below the measuring membrane. A method to produce the pressure sensor by means of which, in particular, more complex shapes of the measuring membrane and/or the base body are producible with minimal pores wherein the base body and/or the measuring membrane have layers applied on each other in a 3-D printing method and produced by the selective laser melting of nanopowder layers.

14 Claims, 2 Drawing Sheets

(51) Int. Cl.
    *B28B 1/00*     (2006.01)
    *B33Y 10/00*     (2015.01)
    *B33Y 80/00*     (2015.01)
    *B33Y 70/00*     (2015.01)
    *B22F 3/105*     (2006.01)
    *B22F 7/06*     (2006.01)
    *C04B 35/111*     (2006.01)
    *C04B 35/486*     (2006.01)
    *C04B 35/653*     (2006.01)
    *C04B 37/00*     (2006.01)

(52) U.S. Cl.
    CPC .. *C04B 2237/343* (2013.01); *C04B 2237/348* (2013.01); *C04B 2237/592* (2013.01); *C04B 2237/62* (2013.01)

(56) References Cited

U.S. PATENT DOCUMENTS

| | | |
|---|---|---|
| 2009/0206065 A1 | 8/2009 | Kruth |
| 2012/0055256 A1* | 3/2012 | Drewes ................ G01L 9/0042 73/753 |
| 2015/0219514 A1* | 8/2015 | Novellani ........... G01L 19/0092 73/714 |
| 2016/0223378 A1* | 8/2016 | Chokri ................. G01L 9/0048 |

* cited by examiner

CERAMIC PRESSURE SENSOR AND METHOD FOR ITS PRODUCTION

TECHNICAL FIELD

The present invention relates to a ceramic pressure sensor with a ceramic base body, a ceramic measuring membrane which is disposed on the base body and can be charged with a pressure to be measured, and a pressure measuring chamber enclosed in the base body below the measuring membrane.

BACKGROUND DISCUSSION

Ceramic pressure sensors are used widely in nearly every area of industrial measuring.

Ceramic pressure sensors can be designed as absolute pressure sensors which can measure the absolute pressure acting on the measuring membrane with respect to vacuum. They can be designed as relative pressure sensors which measure the pressure acting on the measuring membrane relative to a reference pressure that is applied to the pressure measuring chamber, such as the current atmospheric pressure. Alternately, they can be designed as differential pressure sensors with a measuring membrane disposed between two base bodies, while enclosing a pressure measuring chamber in each case, and the differential pressure sensors measure a pressure differential between a first pressure acting on a first side of the measuring membrane and a second pressure acting on the second side of the measuring membrane.

Today, ceramic pressure sensors are frequently designed as so-called capacitive pressure sensors. Capacitive pressure sensors have a capacitive converter that serves to determine by measurement the deflection of the measuring membrane depending on the pressure acting on the measuring membrane. Ceramic capacitive pressure sensors normally have an electrode disposed on a side of the measuring membrane facing the base body, and a counter electrode disposed on the side of the base body facing the measuring membrane. Electrodes and counter electrodes are normally metallic layers sputtered onto the inside of the measuring membrane, or onto the end face of the base body facing the measuring membrane. The counter electrode is normally electrically connected by a contact pin that is inserted into a straight bore running through the base body before sputtering the counter electrode. Electrode and counter electrode form a capacitor with a capacitance that depends on the deflection of the measuring membrane and which, for example, is detected by means of a capacitance measuring circuit, and which is assigned to a corresponding pressure measuring result via, for example, a characteristic curve which has been determined beforehand in a calibration method.

Today, ceramic base bodies as well as ceramic measuring membranes of ceramic pressure sensors are normally made from granules that are poured into a prefabricated mold. Then the granules are pressed by pressing a precisely-fitting, correspondingly shaped punch into the mold, and the pressed granules are sintered.

In this manner, simple geometric shapes of base bodies and measuring membranes, such as disks or cylinders, can be created with comparatively low production tolerances. The achievable production tolerances can furthermore be enhanced by subsequently precision-grinding the sintered bodies. However, the production of complex geometric bodies using this method is subject to narrow limits.

When pressing the granules, inhomogeneities can arise which can generate pores in the sintered body. The danger of inhomogeneities possibly occurring is all the greater the more complex the shape of the sintered body. Pores reduce the compressive strength of the sintered body.

SUMMARY OF THE INVENTION

An object of the invention is to present a ceramic pressure sensor produced using an alternative production method, as well as a method to produce the pressure sensor, by means of which, in particular, more complex shapes of the measuring membrane and/or base body are producible with minimal pores.

This object is achieved by a pressure sensor comprising:
a ceramic base body,
a ceramic measuring membrane that is disposed on the base body and can be charged with a pressure to be measured, and
a pressure measuring chamber enclosed in the base body under the measuring membrane, characterized in that
the base body and/or the measuring membrane have layers that are applied on each other in a 3-D printing method and are produced by the selective laser melting of nanopowder layers.

According to a preferred embodiment, the layers have a layer thickness within the micrometer range.

According to a first development, the base body and/or the measuring membrane comprise at least one structure consisting of stacked layers of corresponding footprint.

According to one embodiment of the first development:
the base body has an elevation on its end face facing the measuring membrane, and
the elevation is a structure consisting of stacked layers.

An additional embodiment of the first development provides that:
the measuring membrane has a reinforcement in a central region, and
the reinforcement is a structure consisting of stacked layers.

An additional embodiment of the first development provides that:
an outer edge of the measuring membrane is connected by a joint to an outer edge of an end face of the base body facing the measuring membrane,
in a region of the end face of the base body facing the measuring membrane directly adjacent to an inner side of the joint, the base body has a groove which is closed to form a ring, and
the groove is a structure consisting of stacked openings, which are closed to form a ring, in the layers of the base body facing the measuring membrane.

A second development provides that:
the pressure sensor has a capacitive electromechanical converter for measuring a deflection of the measuring membrane depending on the pressure acting on the measuring membrane,
the converter has an electrode disposed on a side of the measuring membrane facing the base body, and a counter electrode disposed on the side of the base body facing the measuring membrane, and
the electrode and/or the counter electrode have at least one layer printed in a 3-D printing method, in particular a layer generated by applying a metallic nanopowder layer, in particular a metallic nanopowder layer consisting of titanium or tantalum metal powder, selective laser melting and subsequent hardening.

A third development provides that:
the pressure sensor has a capacitive electromechanical converter for measuring a deflection of the measuring membrane depending on the pressure acting on the measuring membrane,
the converter has a counter electrode disposed on a side of the base body facing the measuring membrane, in particular a counter electrode having at least one layer generated by applying a metallic nanopowder layer, in particular a nanopowder layer consisting of titanium or tantalum metal powder, selective laser melting and subsequent hardening,
the base body comprises a connecting line which runs from the counter electrode to a connecting point disposed on an outer lateral surface of the base body, in particular to a connecting point disposed on an outside lateral surface of the base body,
the base body has stacked layers which are produced by the selective laser melting of nanopowder layers and through which the connecting line runs,
these layers each have one ceramic and one metallic region,
the metallic regions of the adjoining layers are adjacent to each other, and
the adjacent metallic regions form the connecting line.

In a preferred embodiment, the pressure sensor has a membrane bed that is built from stacked layers produced by the selective laser melting of nanopowder layers.

Another preferred embodiment provides that:
in the base body, a bore is provided that runs through the base body and ends in the pressure measuring chamber,
the base body has stacked layers which are produced by the selective laser melting of nanopowder layers and through which the bore runs, and
the bore consists of adjoining openings provided in these layers.

In another embodiment, the base body and/or the measuring membrane consists of ultrapure ceramic, in particular of ultrapure aluminum oxide, in particular aluminum oxide ($Al_2O_3$) with a degree of purity greater than or equal to 95%, in particular greater than or equal to 99%, or ultrapure zirconium oxide, in particular zirconium oxide ($ZrO_2$) with a degree of purity greater than or equal to 95%, in particular greater than or equal to 99%.

Furthermore, the invention comprises a method for the production of a pressure sensor according to the invention which is characterized in that the ceramic layers of the pressure sensor are generated in a 3-D printing method in which each ceramic layer is generated as follows:
a nanopowder of the ceramic is applied in a nanopowder layer, in particular with a squeegee,
the regions of the nanopowder layer forming the layer are fully melted by selective laser melting, in particular selective laser melting performed with a pulse laser generating laser pulses of short duration, in particular a picosecond laser or a femtosecond laser, and subsequently reharden.

In a development of the method according to the invention for the production of a pressure sensor according to the second development, the metal layers of the pressure sensor are generated in a 3-D printing method in which each metallic layer is generated as follows:
a nanopowder of the metal is applied in a nanopowder layer, in particular with a squeegee,
the metallic regions of the nanopowder layer forming the layer are fully melted by selective laser melting, in particular selective laser melting performed with a pulse laser generating laser pulses of short duration, in particular a picosecond laser or a femtosecond laser, and subsequently reharden.

In a development of the method according to the invention for producing a pressure sensor according to the third development, or the embodiment cited with reference thereto, which has at least one layer that comprises at least one metallic region and at least once ceramic region, the layers having at least one metallic and at least one ceramic region are generated in a 3-D printing method in which:
a nanopowder of the ceramic is applied in a nanopowder layer, in particular with a squeegee,
the regions of the ceramic nanopowder layer forming the ceramic regions of the layer are fully melted by selective laser melting, in particular selective laser melting performed with a pulse laser generating laser pulses of short duration, in particular a picosecond laser or a femtosecond laser, and subsequently reharden,
the unmelted ceramic nanopowder is removed,
a nanopowder of the metal is introduced in a nanopowder layer in the openings arising from the removal of the ceramic nanopowder, and
the regions of the metallic nanopowder layer forming the metallic regions of the layer are fully melted by selective laser melting, in particular selective laser melting performed with a pulse laser generating laser pulses of short duration, in particular a picosecond laser or a femtosecond laser, and subsequently reharden.

BRIEF DESCRIPTION OF THE DRAWINGS

The invention and its advantages will now be explained in detail with reference to the figures in the drawing which show four examples of embodiments. The same elements are indicated by the same reference numbers in the figures.

DETAILED DISCUSSION IN CONJUNCTION WITH THE DRAWINGS

Figure 1:
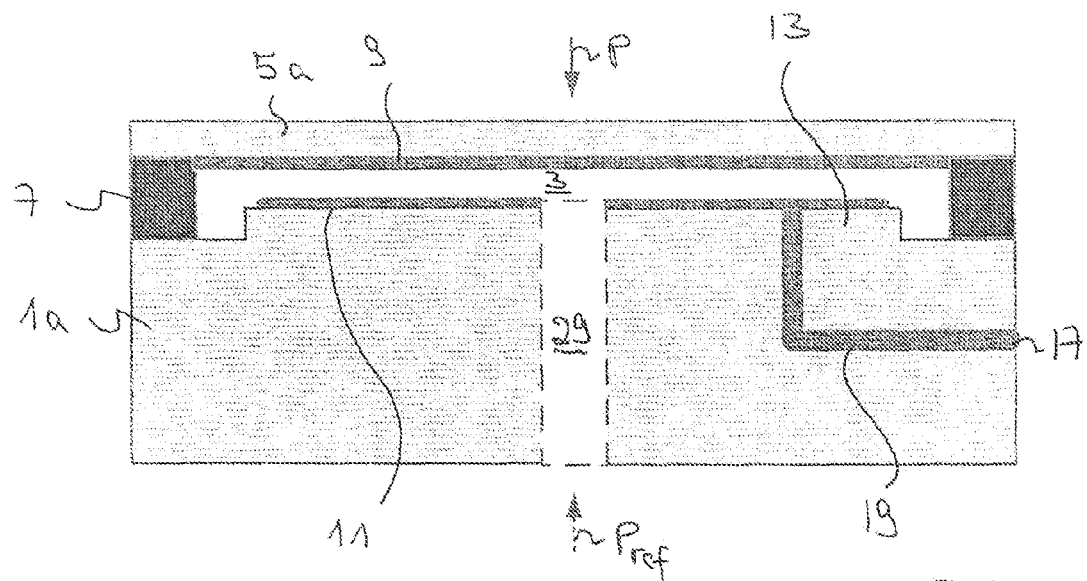
FIG. 1 shows: a ceramic pressure sensor with a base body with an elevation.

The invention relates to a ceramic pressure sensor with a ceramic base body, a ceramic measuring membrane which is disposed on the base body and can be charged with a membrane pressure to be measured, and a pressure measuring chamber enclosed in the base body below the measuring membrane.

According to the invention, the base body and/or the measuring membrane have layers which are applied on each other in a 3-D printing method. 3-D printing methods for producing three-dimensional bodies constructed from stacked layers are known in the prior art and are presently used to produce three-dimensional bodies consisting of a plurality of different materials, in particular ceramic and metallic materials. In particular, selective laser sintering and selective laser melting are among the known methods.

The layers on the base body and/or the measuring membrane of the pressure sensors according to the invention are produced by selective laser melting. In this process, the desired material is provided in the form of a nanopowder which is applied as a nanopowder layer, is completely melted by selective laser melting, and forms the respective layer after hardening.

The individual layers preferably have a layer thickness within the micrometer range.

To produce pure ceramic layers, preferably nanopowders consisting of ultrapure ceramic are used, in particular ultrapure aluminum oxide ($Al_2O_3$), in particular aluminum oxide ($Al_2O_3$) with a degree of purity greater than or equal to 95%, in particular greater than or equal to 99%, such as 99.9%. Alternately, ultrapure and thus high-strength zirconium oxide ($ZrO_2$) can be used, in particular zirconium oxide ($ZrO_2$) with a degree of purity greater than or equal to 95%, in particular greater than or equal to 99%, such as 99.9%.

The stacked layers are produced by first applying a base coat on a substrate. For this purpose, a nanopowder layer is applied on a substrate, is then fully melted by selective laser melting and subsequently hardens. Each additional layer is subsequently generated in that an additional nanopowder layer is applied to the last-produced, already-hardened layer, melted there by laser melting, and then hardens. A very strong, nearly pore-free joint simultaneously forms between the newly-applied and the previously-produced layer.

Nanopowder layers of a correspondingly low thickness are for example applied using a squeegee. In this way, nanopowder layers which have a thickness greater than or equal to 1 μm can be applied. The nanopowder which is used also has the advantage that it can be applied in thin layers with a comparatively high density.

To achieve a high resolution, preferably pulse lasers which generate laser pulses of short duration are used for selectively melting the regions of the nanopowder layers needed to generate the layer. In doing so, the supply of energy caused by the laser pulses is increasingly spatially restricted the shorter the pulse duration. Picosecond lasers are for example suitable for this purpose. An even higher resolution and accordingly lower production tolerance is achievable by using femtosecond lasers.

The selective laser melting of layers with this minimal thickness has the advantage that the layers are created nearly pore-free and are bonded together due to the complete melting of the nanopowder. Pores or even cracks are thereby prevented. A high-pressure resistance of the layered bodies constructed from these layers is thereby achieved.

The described 3-D printing method makes it possible to generate nearly pore-free base bodies and/or measuring membranes with more complex shapes, in particular shapes having undercuts. Accordingly, base bodies having structures and/or measuring membranes with high pressure resistance can be generated, and the structures which are largely pressure resistant can be printed on the base body and/or the measuring membrane.

FIG. 1 shows a first exemplary embodiment of a pressure sensor according to the invention. This comprises a ceramic base body 1a and a ceramic measuring membrane 5a disposed on the base body 1a while enclosing a pressure measuring chamber 3. For this purpose, an outer edge of the measuring membrane 5a is connected by a joint 7 to an outer edge of an end face of the base body 1a facing the measuring membrane 5a. The joint 7 is preferably an active hard soldering designed with a ternary hardening solder having a Zr—Ni alloy and titanium, as for example described in EP 0 490 807 A2.

The distance between the end face of the base body 1a and the measuring membrane 5a is determined by the height of the joint 7. The joint 7 is for example created by means of a solder molding, in particular a soldering ring, of an appropriate height, or soldering paste printed in an appropriate thickness.

According to the invention, the base body 1a and/or the measuring membrane 5a has layers which are applied on each other in a 3D printing method by the selective laser melting of nanopowder layers in the above-described manner. Preferably, the base body 1a and measuring membrane 5a are formed entirely as a layered body constructed from these layers as shown in FIG. 1. Alternately, however, it is possible for only sections of the base body and/or measuring membrane to be formed as such layered bodies. In this case, the remaining part of the base body serves as a substrate on which the layers of the section formed as the layered body are applied.

The layered bodies have the advantage that they are basically pore-free and consequently possess an extremely high pressure resistance. The pressure sensor can accordingly be used in particular for measuring very high pressures.

Furthermore, due to the laser melting which can be performed in an extremely precise manner, the layered bodies have low production tolerances, and the surfaces of the end faces of the layered bodies form smooth surfaces so that the surfaces normally do not have to be reground.

The pressure sensor shown in FIG. 1 has a capacitive electromechanical converter that serves to determine by measurement the deflection of the measuring membrane 5a depending on the pressure p acting on the measuring membrane 5a. The converter comprises an electrode 9 disposed on a side of the measuring membrane 5a facing the base body 1a, and a counter electrode 11 disposed on the end face of the base body 1a facing the measuring membrane 5a. The electrode 9 and counter electrode 11 form a capacitor with a capacitance that depends on the deflection of the measuring membrane 5a and which, for example, is detected by means of a capacitance measuring circuit (not shown), and which is assigned to a corresponding pressure measuring result via, for example, a characteristic curve which has been determined beforehand in a calibration method.

As an example of a base body having a structure, the base body 1a of the pressure sensor from FIG. 1 has, on its end face facing the measuring membrane 5a, an elevation 13, which extends into the pressure measuring chamber 3 and is constructed from layers, applied on each other in a 3-D printing method, of corresponding surface areas. The elevation 13 has an end face which runs parallel to the measuring membrane 5a and on which the counter electrode 11 is disposed. The height of the elevation 13 in relation to the height of the joint 7 determines the electrode spacing between the electrode 9 and counter electrode 11. The electrode spacing determines the basic capacitance of the capacitor which in turn also influences the measuring precision achievable with the pressure sensor. The reduction of the electrode spacing caused by the elevation 13 causes an increase in the basic capacitance which increases the achievable measuring precision.

Figure 2:
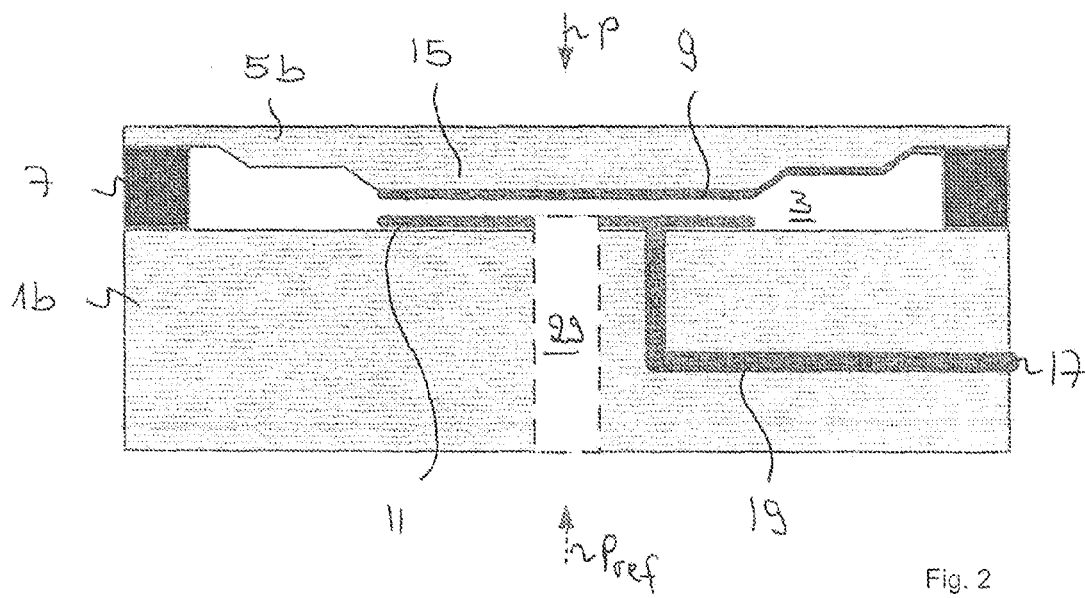
FIG. 2 shows: a ceramic pressure sensor with a boss membrane.

FIG. 2 shows an additional exemplary embodiment of a pressure sensor according to the invention. Giving the extensive correspondence with the pressure sensor depicted in FIG. 1, only the existing differences will be explained in the following. These differences are that the base body 1b of the pressure sensor from FIG. 2 does not have an elevation 13, and the measuring membrane 5b of the pressure sensor from FIG. 2 has a structure that is generated in a 3-D printing method and consists of stacked layers of corresponding surface areas. The structure in this exemplary embodiment arises from the measuring membrane 5b being designed as a boss membrane which has a reinforcement 15 in a central region.

The reinforcement 15 preferably has a front surface which runs parallel to the opposing end face of the base body 1b, and on which the electrode 9 is disposed. Precisely like the elevation 13 depicted in FIG. 2, the reinforcement 15 thereby causes a reduction in the electrode spacing with the associated advantages. Furthermore, the reinforcement 15 creates a linear dependency between the measured, pressure-dependent capacitances, or the pressure-dependent changes in capacitance, and the pressure p to be measured, which also increases the measuring precision.

The electrode 9 and counter electrode 11 of the pressure sensors according to the invention can be designed as sputtered electrodes as is the case with conventional pressure sensors.

In conjunction with a measuring membrane 5a, 5b produced by the above-described 3-D printing method, the electrode 9 is preferably an electrode which is printed in the same 3-D printing method on the side of the measuring membrane 5a, 5b facing the base body 1a, 1b, and which has at least one layer generated by applying a metallic nanopowder, selective laser melting and subsequent hardening. Depending on the desired electrode thickness, of course two or more metallic layers can also be applied on each other.

In conjunction with a base body 1a, 1b produced in the above-described 3-D printing method, the counter electrode 11 is preferably an electrode which is printed in the same 3-D printing method on the end face of the base body 1a, 1b facing the measuring membrane 5a, 5b, and which has a least one layer generated by applying a metallic nanopowder, selective laser melting, and subsequent hardening. Depending on the desired electrode thickness, of course two or more metallic layers can also be applied on each other.

To produce the metallic layers, a nanopowder of a metal is preferably used that has a thermal expansion coefficient adapted to the thermal expansion coefficient of the ceramic. Titanium or tantalum metal powders are particularly suitable for this purpose.

Just like conventional capacitive ceramic pressure sensors, the pressure sensors according to the invention are also to be equipped with a connecting line 19 which runs from the counter electrode 11 to a connecting point 17 disposed on an outer lateral surface of the base body 1a, 1b, and by means of which the electrical connection of the counter electrode 11 is realized.

The connecting line 19 is preferably also produced in the above-described 3-D printing method. In this case, the individual layers of the base body 1a, 1b through which the connecting line 19 runs each have a ceramic region and a metallic region forming a section of the connecting line 19. The metallic regions are designed such that the metallic regions of adjoining layers are adjacent to each other, and the adjoining metallic regions form the connecting line 19 leading from the counter electrode 11 to a connecting point 17 disposed on an outer lateral surface of the base body 1.

The layers through which the connecting line 15 [sic 19] runs are preferably produced by first applying a ceramic nanopowder layer on the entire surface, and generating the ceramic region of the respective layer therefrom by selective laser melting and subsequent hardening. Then the unmelted ceramic nanopowder is removed, and a metallic nanopowder layer is introduced in thereby-arising openings from which the metallic region is then generated by selective laser melting and subsequent hardening. Here as well due to the melting and hardening, nearly pore-free joints are created between the metallic and ceramic regions of each of these layers, as well as between the stacked layers.

The metallic regions are preferably produced from a nanopowder of a metal which has a thermal expansion coefficient adapted to the thermal expansion coefficient of the ceramic, such as titanium or tantalum metal powder.

In comparison to conventional connecting lines formed by metal pins inserted into the base body, the connecting line 19 produced in the 3-D printing method possesses the advantage that the connecting line 19 can run through the base body 1 in almost any manner. This has the advantage that, by correspondingly routing the connecting line 19, the connecting point 17 can be disposed on an outside lateral surface of the base body 1 on which the electrode 9 is also contacted via the joint 7.

Figure 3:
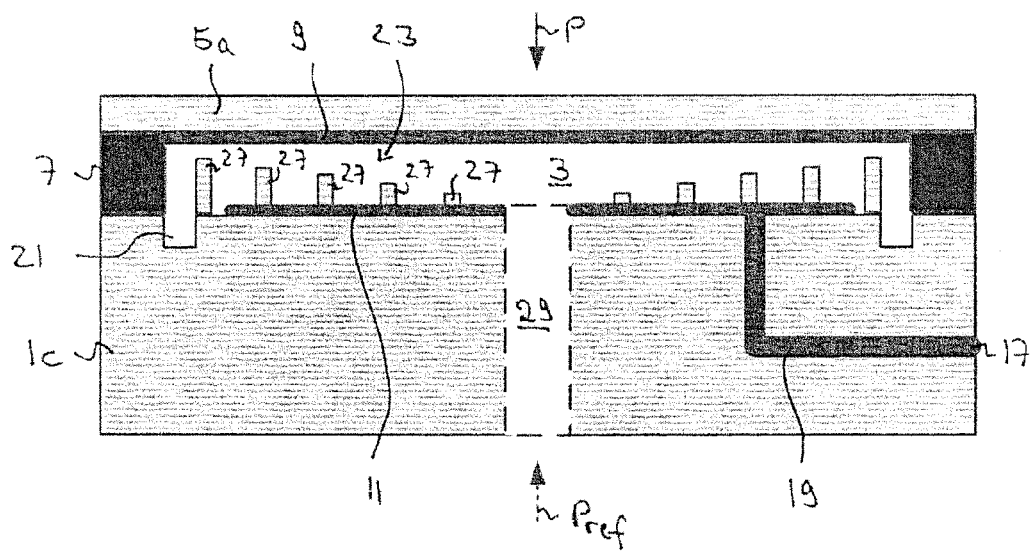
FIG. 3 shows: a ceramic pressure sensor with a groove integrated in the base body, and a membrane bed formed by concentric bars.
Figure 4:
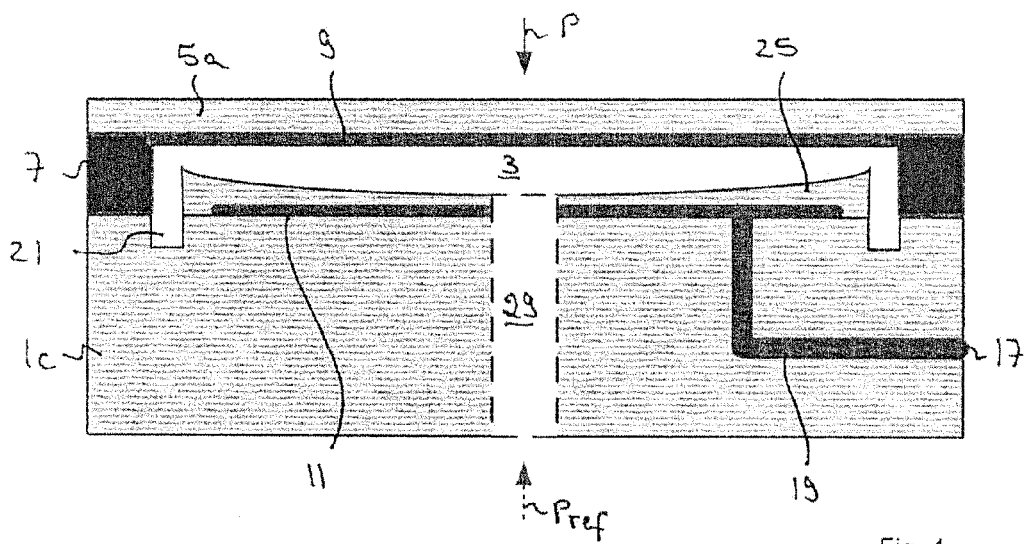
FIG. 4 shows: a ceramic pressure sensor with a groove integrated in the base body and a membrane bed formed by a support body with a surface contour corresponding to the bending contour of the measuring membrane.

FIGS. 3 and 4 show two other exemplary embodiments of pressure sensors according to the invention. Here as well, given the extensive correspondence with the above-described exemplary embodiments, only the existing differences will be explained.

In both exemplary embodiments, the base bodies 1c have a structure. The structure comprises a groove 21 closed to form a ring which is disposed in a region of the end face of the base body 1c facing the measuring membrane 5a directly adjacent to the inside of the joint 7. It serves as a soldering stop groove which prevents penetration of active hard solder in the direction of the pressure measuring chamber 3 while hard soldering. This reduces production tolerances in the dimensions of the joint 7, in particular its height, arising from the solder molding or the printed soldering paste. In this case, the groove 21 consists of openings disposed above each other and closed to form a ring which, in the 3-D printing method for producing the base body 1c, are provided in the corresponding upper layers of the base body 1c facing the measuring membrane 5a.

Furthermore, both pressure sensors are equipped with a membrane bed 33, 25 constructed from stacked layers generated in a 3-D printing method. The membrane beds 23, 25 preferably consist of the same ceramic as the respective base body 1c, and the layers of the membrane beds 23, 25 are generated by the selective laser melting of corresponding nanopowder layers.

The membrane beds 23, 25 serve to support a measuring membrane 5a in the event of an overload acting thereupon and thereby prevent excessive deflection of the measuring membrane 5a which could damage it. For this purpose, the membrane beds 23, 25 have a geometry which is adapted to the bending contour of the measuring membrane 5a and against which the measuring membrane 5a comes to rest in the event of an overload.

In the exemplary embodiment depicted in FIG. 3, the membrane bed 23 consists of bars 27 disposed concentric to each other and concentric to a sensor longitudinal axis running parallel to the surface normals on the measuring membrane 5a through the middle of the measuring membrane 5a, and the height of the bars rises from the inside to the outside corresponding to the bending contour of the measuring membrane 5a in the event of an overload acting thereupon.

The bars 27 preferably consist of layers applied on each other in the above-described manner and produced by the selective laser melting of nanopowder layers. In this manner, bars 17 can be applied in the described 3-D printing method both on the end face of the base body 1c facing the measuring membrane 5a, as well as on the counter electrode 11 printed thereupon. In doing so, the ceramic layers, each located in a plane, of the bars 27 to be applied directly on the end face of the base body 1c, and the metallic layers of the counter electrode 11 are produced in the manner described above in conjunction with the production of the connecting line 19, wherein the ceramic layers of the bars correspond to the ceramic regions, and the metallic layers of the counter electrode correspond to the metallic regions.

In the exemplary embodiment depicted in FIG. 4, the membrane bed is designed as a support body applied to the end face of the base body 1c facing the measuring membrane 5a, and the top side of the support body facing the measuring membrane 5a has a shape which corresponds to the bending contour of the measuring membrane 5a.

This support body also consists of layers which are applied on each other in the above-described manner and produced by the selective laser melting of nanopowder layers.

For this purpose, the support body can be printed directly on the counter electrode 11, or extend beyond its edge. In the latter case, the pressure sensor again has layers with a ceramic region forming a part of the support body, and a metallic region forming a part of the counter electrode 11. These layers again are generated in the above-describe manner in conjunction with the production of the connecting line 19.

The pressure sensors according to the invention can be designed as absolute pressure sensors which measure an absolute pressure p exerted on the outside of the measuring membrane 5a, 5b, i.e., relative to a vacuum pressure. In this case, the pressure measuring chamber 3 enclosed below the measuring membrane 5a, 5b is evacuated.

Alternatively, they can be designed as relative pressure sensors. In this case, a bore 29 is to be provided in the base body 1a, 1b, 1c which runs through the base body 1a, 1b, 1c and ends in the pressure measuring chamber 3, and by means of which a reference pressure $p_{ref}$ can be supplied to the pressure measuring chamber 3 with respect to which the pressure p to be measured is measured. In all of the depicted exemplary embodiments, the bore 29 is depicted as an option drawn in a dashed line.

In the base bodies 1a, 1b, 1c produced in the described 3-D printing method, the bore 29 consists of stacked openings in the layers forming the base body 1a, 1b, 1c and in the layers forming the counter electrode 11.

Alternately, the pressure sensors according to the invention can be designed as differential pressure sensors. In this case, the measuring membrane 5a, 5b of the corresponding relative pressure sensors is to be provided with a second base body designed identical to the first base body 1a, 1b, 1c on the side facing away from the base body 1a, 1b, 1c. In conjunction with the relative pressure sensor with a boss membrane depicted in FIG. 2, a measuring membrane is preferably used in the corresponding differential pressure sensor which is equipped on both sides with a corresponding reinforcement.

In measuring mode, the first side of the measuring membrane 5a, 5b facing the first base body 1a, 1b, 1c is charged with a first pressure $p_1$ through the bore 29 in the first base body 1a, 1b, 1c, and the second side of the measuring membrane 5a facing the second base body is charged with a second pressure $p_2$. The measuring membrane 5a thus experiences a deflection depending on the difference between the two effective pressures $p_1$, $p_2$ which is detected by measurement and converted into a corresponding differential pressure measuring signal.

The invention claimed is:

1. A pressure sensor, comprising:
a ceramic base body;
a ceramic measuring membrane that is disposed on said base body and that is exposed to a pressure to be measured; and
a pressure measuring chamber enclosed in said base body under said measuring membrane, wherein:
said base body and/or said measuring membrane comprises layers which are applied on each other in a 3-D printing method and produced by the selective laser melting of nanopowder layers.

2. The pressure sensor according to claim 1, wherein:
said layers have a layer thickness within the micrometer range.

3. The pressure sensor according to claim 1, wherein:
said base body and/or said measuring membrane comprise at least one structure consisting of stacked layers of corresponding footprint.

4. The pressure sensor according to claim 3, wherein:
said base body has an elevation on its end face facing measuring said membrane; and
said elevation is a structure consisting of stacked layers.

5. The pressure sensor according to claim 3, wherein:
said measuring membrane has a reinforcement in a central region; and
said reinforcement is a structure consisting of stacked layers.

6. The pressure sensor according to claim 3, wherein:
an outer edge of said measuring membrane is connected by a joint to an outer edge of an end face of said base body facing said measuring membrane;
in a region of said end face of the base body facing said measuring membrane directly adjacent to an inner side of said joint, said base body has a groove which is closed to form a ring; and
said groove is a structure consisting of stacked openings, which are closed to form a ring, in the layers of said base body facing said measuring membrane.

7. The pressure sensor according to claim 1, wherein:
the pressure sensor has a capacitive electromechanical converter for measuring a deflection of said measuring membrane depending on the pressure acting on said measuring membrane;
said converter has an electrode disposed on a side of said measuring membrane facing said base body and a counter electrode disposed on the side of said base body facing said measuring membrane; and
said electrode and/or said counter electrode have at least one layer printed in a 3-D printing method, in particular a layer generated by applying a metallic nanopowder layer, in particular a nanopowder layer consisting of titanium or tantalum metal powder, selective laser melting and subsequent hardening.

8. The pressure sensor according to claim 1, wherein:
the pressure sensor has a capacitive electromechanical converter for measuring a deflection of said measuring membrane depending on the pressure acting on said measuring membrane;
said converter has a counter electrode disposed on a side of said base body facing said measuring membrane, in particular said counter electrode having at least one layer generated by applying a metallic nanopowder layer, in particular a nanopowder layer consisting of titanium or tantalum metal powder, selective laser melting and subsequent hardening;

said base body comprises a connecting line which runs from said counter electrode to a connecting point disposed on an outer lateral surface of said base body, in particular to a connecting point disposed on an outside lateral surface of said base body;

said base body has stacked layers which are produced by the selective laser melting of nanopowder layers and through which said connecting line runs;

these layers each have one ceramic and one metallic region;

the metallic regions of the adjoining layers are adjacent to each other; and the adjoining metal regions form said connecting line.

9. The pressure sensor according to claim 1, wherein:
the pressure sensor has a membrane bed that is constructed from stacked layers produced by the selective laser melting of nanopowder layers.

10. The pressure sensor according to claim 1, wherein:
in said base body, a bore is provided that ends in a pressure measuring chamber running through said base body;

said base body has stacked layers which are produced by the selective laser melting of nanopowder layers and through which said bore runs; and said bore consists of adjoining openings provided in these layers.

11. The pressure sensor according to claim 1, wherein:
said base body and/or said measuring membrane consists of ultrapure ceramic, in particular ultrapure aluminum oxide ($Al_2O_3$), in particular aluminum oxide ($Al_2O_3$) with a degree of purity greater than or equal to 95%, in particular greater than or equal to 99%, or ultrapure zirconium oxide ($ZrO_2$), in particular zirconium oxide ($ZrO_2$) with a degree of purity greater than or equal to 95%, in particular greater than or equal to 99%.

12. A method for the production of a pressure sensor, comprising:

a ceramic base body; a ceramic measuring membrane that is disposed on said base body and that can be charged with a pressure to be measured; and a pressure measuring chamber enclosed in said base body under said measuring membrane, wherein: said base body and/or said measuring membrane comprises layers which are applied on each other in a 3-D printing method and produced by the selective laser melting of nanopowder layers; wherein the ceramic layers of the pressure sensor are generated in a 3-D printing method in which each ceramic layer is generated as follows:

a nanopowder of the ceramic is applied in a nanopowder layer, in particular with a squeegee; and the regions of the nanopowder layer forming the layer are fully melted by selective laser melting, in particular selective laser melting performed with a pulse laser generating laser pulses of short duration, in particular a picosecond laser or a femtosecond laser, and subsequently reharden.

13. A method for the production of a pressure sensor, which comprises:

a ceramic base body; a ceramic measuring membrane that is disposed on said base body and that is exposed to a pressure to be measured; and a pressure measuring chamber enclosed in said base body under said measuring membrane, wherein: said base body and/or said measuring membrane comprises layers which are applied on each other in a 3-D printing method in a melting of nanopowder layers; the pressure sensor has a capacitive electromechanical converter for measuring a deflection of said measuring membrane depending on the pressure acting on said measuring membrane; said converter has an electrode disposed on a side of said measuring membrane facing said base body and a counter electrode disposed on the side of said base body facing said measuring membrane; and said electrode and/or said counter electrode have at least one layer printed in a 3-D printing method, in particular a layer generated by applying a metallic nanopowder layer, in particular a nanopowder layer consisting of titanium or tantalum metal powder, selective laser melting and subsequent hardening; and the metallic layers of the pressure sensor are generated in a 3-D printing method in which each metallic layer is generated as follows:

a nanopowder of the metal is applied in a nanopowder layer, in particular with a squeegee; and the regions of the nanopowder layer forming the metallic layer are fully melted by selective laser melting, in particular selective laser melting performed with a pulse laser generating laser pulses of short duration, in particular a picosecond laser or a femtosecond laser, and subsequently reharden.

14. A method for the production of a pressure sensor, comprising:

a ceramic base body; a ceramic measuring membrane that is disposed on said base body and that is exposed to a pressure to be measured; and a pressure measuring chamber enclosed in said base body under said measuring membrane, wherein: said base body and/or said measuring membrane comprises layers which are applied on each other in a 3-D printing method and produced by the selective laser melting of nanopowder layers, the pressure sensor has a capacitive electromechanical converter for measuring a deflection of said measuring membrane depending on the pressure acting on said measuring membrane; said converter has a counter electrode disposed on a side of said base body facing said measuring membrane, in particular said counter electrode having at least one layer generated by applying a metallic nanopowder layer, in particular a nanopowder layer consisting of titanium or tantalum metal powder, selective laser melting and subsequent hardening; said base body comprises a connecting line which runs from said counter electrode to a connecting point disposed on an outer lateral surface of said base body, in particular to a connecting point disposed on an outside lateral surface of said base body; said base body has stacked layers which are produced by the selective laser melting of nanopowder layers and through which said connecting line runs; these layers each have one ceramic and one metallic region; the metallic regions of the adjoining layers are adjacent to each other; and the adjoining metal regions form said connecting line;

which has at least one layer comprising at least one metallic region and at least one ceramic region, characterized in that the layers having at least one metallic region and at least once ceramic region are generated in a 3-D printing method in which:

a nanopowder of the ceramic is applied in a nanopowder layer, inparticular with a squeegee;

the regions of the ceramic nanopowder layer forming the ceramic layer are fully melted by selective laser melting, in particular selective laser melting performed with a pulse laser generating laser pulses of short duration, in particular a picosecond laser or a femtosecond laser, and subsequently reharden;

the unmelted ceramic nanopowder is removed;

a nanopowder of the metal is introduced in a nanopowder layer in the openings arising from the removal of the ceramic nanopowder; and the regions of the metallic nanopowder layer forming the metallic layer are fully melted by selective laser melting, in particular selective laser melting performed with a pulse laser generating laser pulses of short duration, in particular a picosecond laser or a femtosecond laser, and subsequently reharden.

\* \* \* \* \*